(12) United States Patent
Ha et al.

(10) Patent No.: US 10,818,892 B2
(45) Date of Patent: Oct. 27, 2020

(54) SECONDARY BATTERY AND METHOD FOR MANUFACTURING THE SAME

(71) Applicant: LG CHEM, LTD., Seoul (KR)

(72) Inventors: Jeong Min Ha, Daejeon (KR); Jong Hun Kim, Daejeon (KR); Soo Young Kim, Daejeon (KR); Hye Dam Jo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 181 days.

(21) Appl. No.: 15/969,092

(22) Filed: May 2, 2018

(65) Prior Publication Data

US 2018/0342715 A1    Nov. 29, 2018

(30) Foreign Application Priority Data

May 24, 2017    (KR) .................. 10-2017-0064314

(51) Int. Cl.
| | |
|---|---|
| *H01M 2/08* | (2006.01) |
| *H01M 10/0525* | (2010.01) |
| *H01M 10/0585* | (2010.01) |
| *H01M 2/02* | (2006.01) |
| *H01M 10/04* | (2006.01) |

(52) U.S. Cl.
CPC .......... *H01M 2/08* (2013.01); *H01M 2/0212* (2013.01); *H01M 2/0275* (2013.01); *H01M 2/0287* (2013.01); *H01M 10/049* (2013.01); *H01M 10/0436* (2013.01); *H01M 10/0525* (2013.01); *H01M 10/0585* (2013.01); *H01M 2220/20* (2013.01)

(58) Field of Classification Search
CPC ............... H01M 2/08; H01M 2220/20; H01M 10/0525–0585
See application file for complete search history.

(56) References Cited

U.S. PATENT DOCUMENTS

| | | |
|---|---|---|
| 8,148,004 B2 | 4/2012 | Kim et al. |
| 8,530,075 B2 | 9/2013 | Kim et al. |
| 8,852,796 B2 | 10/2014 | Kim |
| 9,755,195 B2 | 9/2017 | Cho et al. |
| 2011/0086259 A1 | 4/2011 | Kim et al. |

(Continued)

FOREIGN PATENT DOCUMENTS

| | | |
|---|---|---|
| KR | 10-2010-0126226 A | 12/2010 |
| KR | 10-2011-0041071 A | 4/2011 |
| KR | 10-2014-0086907 A | 7/2014 |

OTHER PUBLICATIONS

Office Action dated Jul. 1, 2019, from the Korean Patent Office in counterpart Korean patent application No. 10-2017-0064314.

*Primary Examiner* — Osei K Amponsah
(74) *Attorney, Agent, or Firm* — Morgan, Lewis & Bockius LLP (57) ABSTRACT

Provided are a secondary battery in which a sealing part is prevented from damaged by external force and a method for manufacturing the same. The method for manufacturing the secondary battery includes a preparation process of preparing a pouch in which an electrode assembly and an electrolyte are accommodated, a bonding process of bonding a bonding area disposed on a circumferential portion of the pouch by using a bonding device; and a sealing process of sealing a portion of the outside of the bonding area of the pouch that is bonded in the bonding process by using a sealing device.

6 Claims, 7 Drawing Sheets

(56) References Cited

U.S. PATENT DOCUMENTS

2011/0091766 A1    4/2011   Kim
2012/0148914 A1    6/2012   Kim et al.
2015/0000117 A1*   1/2015   Cho .................. H01M 10/0404
                                                      29/623.2

* cited by examiner

SECONDARY BATTERY AND METHOD FOR MANUFACTURING THE SAME

CROSS-REFERENCE TO RELATED APPLICATIONS

This application claims the priority of Korean Patent Application No. 10-2017-0064314 filed on May 24, 2017, in the Korean Intellectual Property Office, the disclosure of which is incorporated herein by reference.

BACKGROUND OF THE INVENTION

Field of the Invention

The present invention relates to a secondary battery and a method for manufacturing the same, and more particularly, to a secondary battery in which a sealing part is prevented from damaged by external force and a method for manufacturing the same.

Description of the Related Art

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A pouch material having a heat-contractible resin layer is disclosed in Korean Utility Model Registration No. 20-0214033.

In manufacturing of a lithium secondary battery, a polymer battery for a vehicle uses a pouch as an external exterior.

Figure 7:
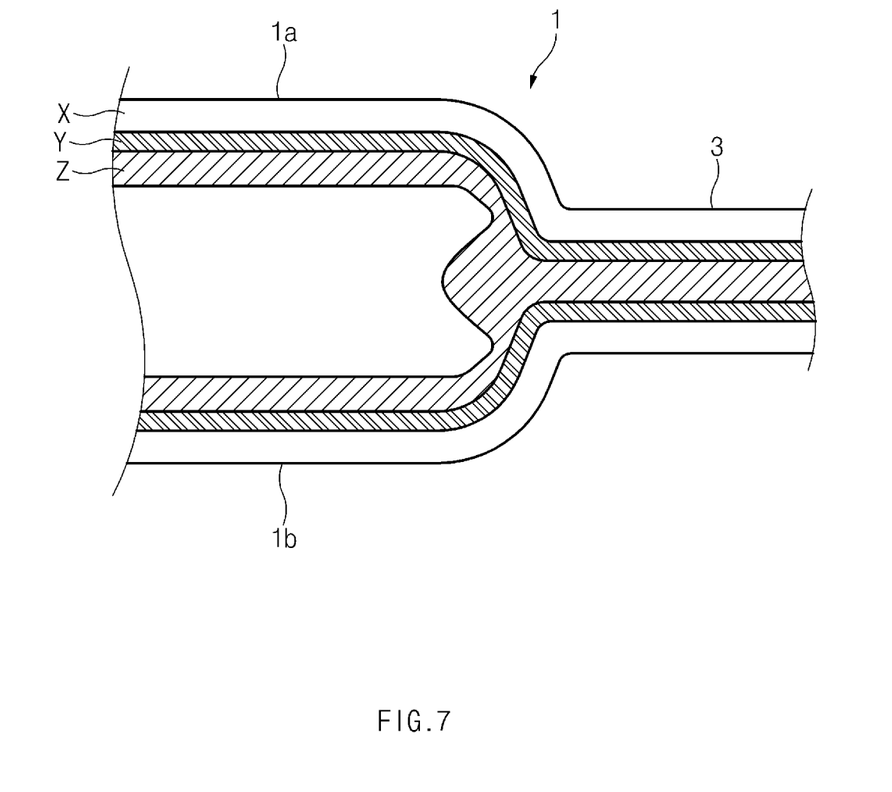
FIG. 7 is a cross-sectional view illustrated by cutting only a portion of a sealing part in a secondary battery according to the related art.

FIG. 7 is a cross-sectional view illustrated by cutting only a portion of a sealing part in a secondary battery according to the related art.

As illustrated in FIG. 7, a pouch 1 of a secondary battery according to the related art includes a nylon layer X on an outer periphery, an aluminum layer Y on a central portion, and a polypropylene (PP) layer Z on the inside.

Here, the polypropylene layer Z is used to bond an upper pouch 1a to a lower pouch 1b through thermal fusion and thereby to seal the pouch 1.

However, in the pouch sealing process such as the thermal fusion, when the polypropylene layer Z of the sealing part 3 is excessively bonded, the polypropylene layer Z becomes thin.

Also, in this state, the polypropylene layer Z that is thinned when the sealing part is bent and folded is damaged, for example, cracked to cause limitations such as insulation failure and pouch corrosion.

SUMMARY OF THE INVENTION

An aspect of the present invention provides a secondary battery in which deformation of a polypropylene layer of a sealing part is minimized to be prevented from damaged, for example, cracked by external force and the deformation and a method for manufacturing the same.

According to another aspect of the present invention, there is provided a method for manufacturing a secondary battery, the method including: a preparation process of preparing a pouch in which an electrode assembly and an electrolyte are accommodated; a bonding process of bonding a bonding area disposed on a circumferential portion of the pouch by using a bonding device; and a sealing process of sealing a portion of the outside of the bonding area of the pouch that is bonded in the bonding process by using a sealing device.

In the bonding process, the bonding area may be bonded at bonding force of about 0.1 kgf/15 mm to about 2.0 kgf/15 mm.

In the bonding process, an internal polypropylene layer of the bonding area may be heated and pressed to be bonded.

In the bonding process, the polypropylene layer may be bonded in a state of being maintained at a predetermined thickness.

In the sealing process, a portion of the bonding area may be heated and pressed at a pressure greater than that applied to the other portion of the bonding area so as to be sealed.

In the sealing process, a portion of the bonding area may be heated and pressed at a temperature greater than that applied to the other portion of the bonding area so as to be sealed.

In the sealing process, a portion of the bonding area may be bonded at bonding force greater than that applied to the other portion of the bonding area so as to be sealed.

In the sealing process, an internal polypropylene layer on a portion of the bonding area is heated and pressed at a temperature and pressure greater than those applied to the other portion of the bonding area so as to be sealed.

In the sealing process, the internal polypropylene layer on a portion of the bonding area may have a thickness less than that of a polypropylene layer on the other portion of the bonding area.

In the sealing process, a portion of the bonding area, on which the folding and the bending are not performed, may be sealed.

According to another aspect of the present invention, there is provided a secondary battery including: a pouch accommodating an electrode assembly and an electrolyte therein; and a bonding area disposed on a circumferential portion of the pouch, wherein the bonding area includes: a weak bonding part that is foldable and bendable; and a sealing part disposed on an outer edge of the weak bonding part and sealed.

The pouch may include an upper pouch and a lower pouch, and the bonding area may be a portion at which the upper pouch and the lower pouch are bonded to each other.

The weak bonding area may be bonded in a state in which each of the upper pouch and the lower pouch is maintained in its original shape.

When each of thicknesses of a polypropylene layer inside the upper pouch and a polypropylene layer inside the lower pouch is referred to as "c", and a thickness of a polypropylene layer inside the weak bonding part is referred to as "t", the following equation: $2c*0.60 \leq t < 2c$ is satisfied.

The sealing part may have a thickness less than that of the weak bonding part.

The weak bonding part may be provided as a layer that is stepped from the sealing part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, a secondary battery and a method for manufacturing the same according to exemplary embodiments of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 1:
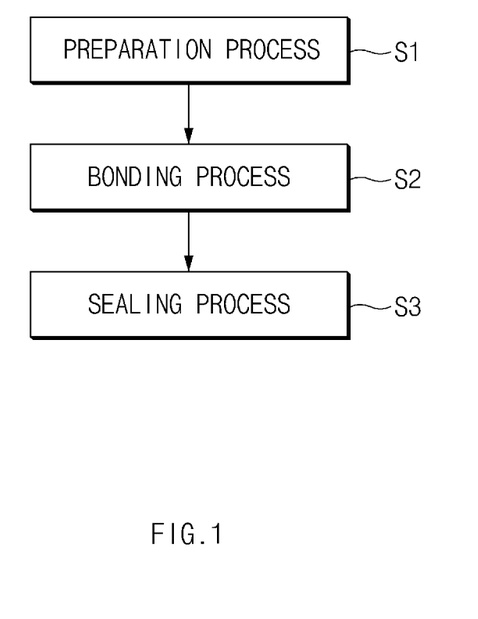
FIG. 1 is a flowchart illustrating a method for manufacturing a secondary battery according to an embodiment of the present invention.

FIG. 1 is a flowchart illustrating a method for manufacturing a secondary battery according to an embodiment of the present invention.

As illustrated in FIG. 1, a method for manufacturing a secondary battery according to an embodiment of the present invention includes a preparation process (S1), a bonding process (S2), and a sealing process (S3).

Figure 2:
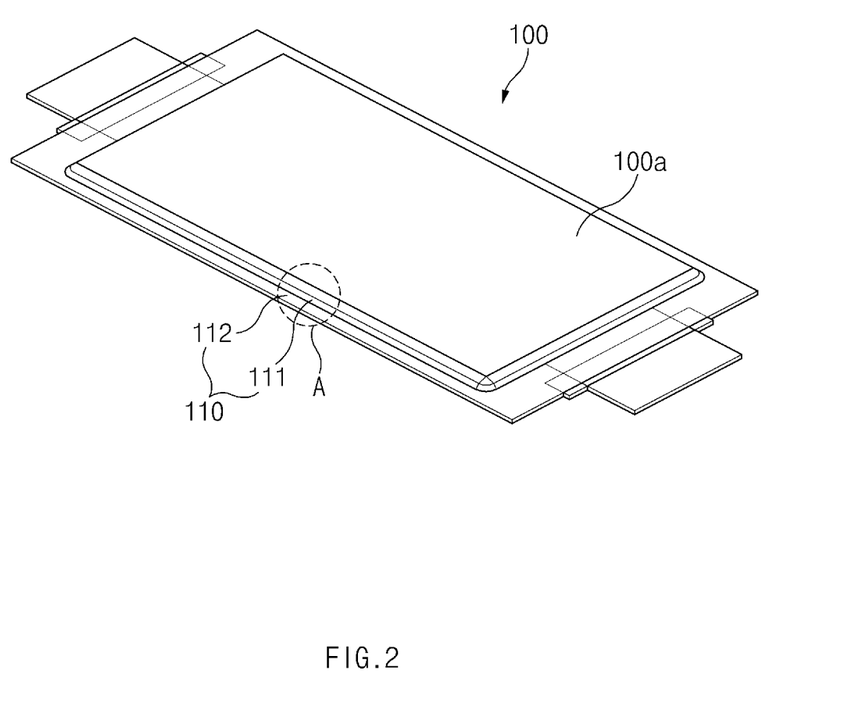
FIG. 2 is a perspective view of the secondary battery according to an embodiment of the present invention.

FIG. 2 is a perspective view of the secondary battery according to an embodiment of the present invention.

Referring to FIG. 2, the preparation process (S1) is a process of preparing a pouch 100 in which an electrode assembly and an electrolyte are accommodated.

Figure 5:
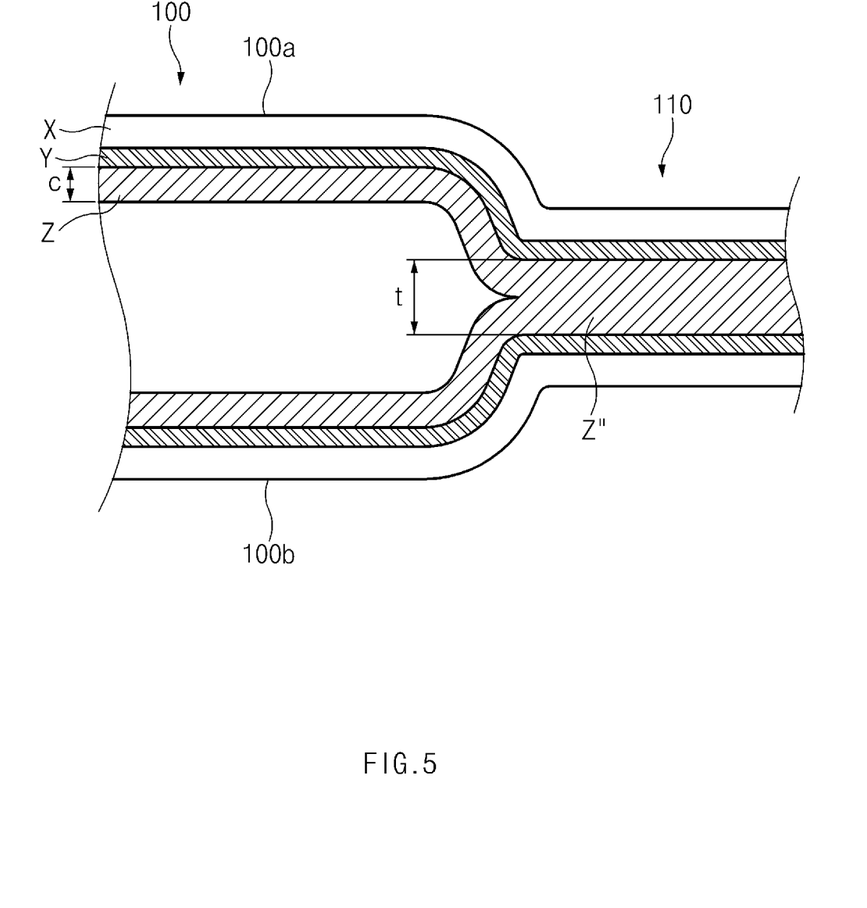
FIG. 5 is a cross-sectional view illustrated by cutting a main part of the secondary battery, which is bonded through a bonding process in the method for manufacturing the secondary battery according to an embodiment of the present invention.

FIG. 5 is a cross-sectional view illustrated by cutting a main part of the secondary battery, which is bonded through the bonding process in the method for manufacturing the secondary battery according to an embodiment of the present invention.

As illustrated in FIG. 5, the bonding process (S2) is a process of bonding a bonding area 110 disposed around the pouch 100 by using a bonding device such as a press for heating and pressing.

The bonding area 110 that is heated and pressed in the bonding process (S2) may be bonded by heating and pressing an internal polypropylene (PP) layer Z between portions of an upper pouch 100a and a lower pouch 100b, which come into contact with each other.

Here, the polypropylene (PP) layer Z of the bonding area 110 may be bonded at bonding force of about 0.1 kgf/15 mm to about 2.0 kgf/15 mm so that the polypropylene layer Z is bonded to be maintained at a constant thickness.

That is, when the bonding area 110 is bonded at the bonding force of about 0.1 kgf/15 mm to about 2.0 kgf/15 mm, the upper pouch 100a and the lower pouch 100b may be maintained in the state of being bended to each other to minimize a variation in shape (thickness) of the polypropylene layer Z of the bonding area 110.

The sealing process (S3) is a process of sealing a portion of the outside of the bonding area 110 of the pouch 100 that is bonded in the bonding process (S2) by using a sealing device.

The sealing device may seal the portion of the outside of the bonding area 110 of the pouch 100 at a pressure and temperature, which are greater than those applied by the bonding device.

That is, in the sealing process (S3), the portion of the outside of the bonding area 110 may be heated and pressed at a pressure and temperature, which are greater than those applied to other portions of the bonding area 110. Thus, an internal polypropylene layer Z' may be bonded at the bonding force (exceeding 2.0 kgf/15 mm) greater than that of the other portion of the bonding area 110 at the portion of the outside of the bonding area 110 to seal the portion of the outside of the bonding area 110, thereby preventing moisture from being permeated into the pouch 100.

Figure 3:
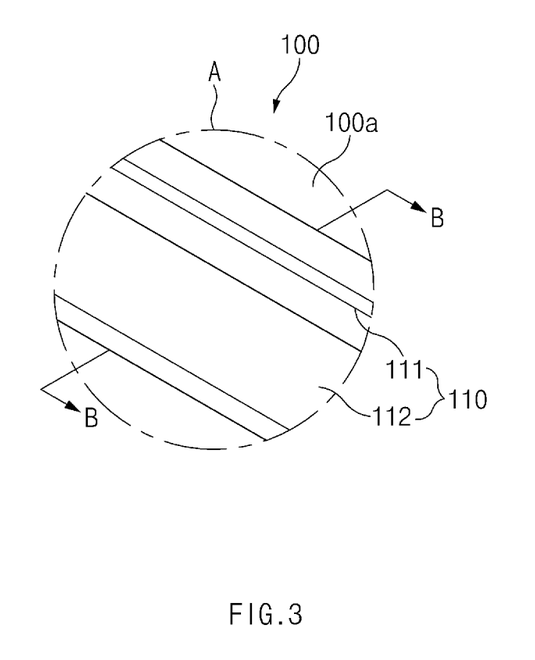
FIG. 3 is a partially enlarged view illustrating only a portion "A" of FIG. 2.
Figure 4:
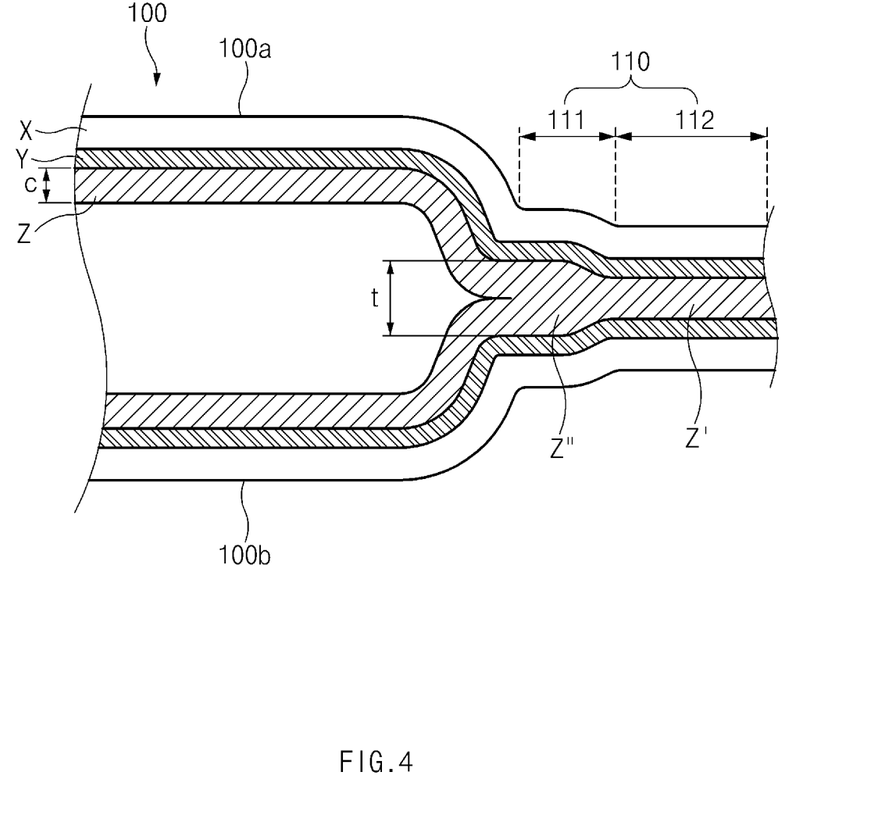
FIG. 4 is a cross-sectional view of a main part taken along line B-B of FIG. 3.

FIG. 3 is a partially enlarged view illustrating only a portion "A" of FIG. 2, and FIG. 4 is a cross-sectional view of a main part taken along line B-B of FIG. 3.

As illustrated in FIGS. 3 and 4, the internal polypropylene layer Z' of the portion of the outside of the bonding area 110 may naturally have a thickness less than that of a polypropylene layer Z" of the other portion of the bonding area 110. Referring to the drawings, the state illustrated in FIG. 4 is obtained after performing the sealing process (S3) in the state illustrated in FIG. 5.

Here, the portion 112 of the outside of the bonding area 110 may be a portion at which the folding and the bending are not performed, and the polypropylene layer Z" of the other portion of the bonding area 110 may be a portion that is foldable and bendable. (That is, a portion at which the folding and the bending are performed)

Figure 6:
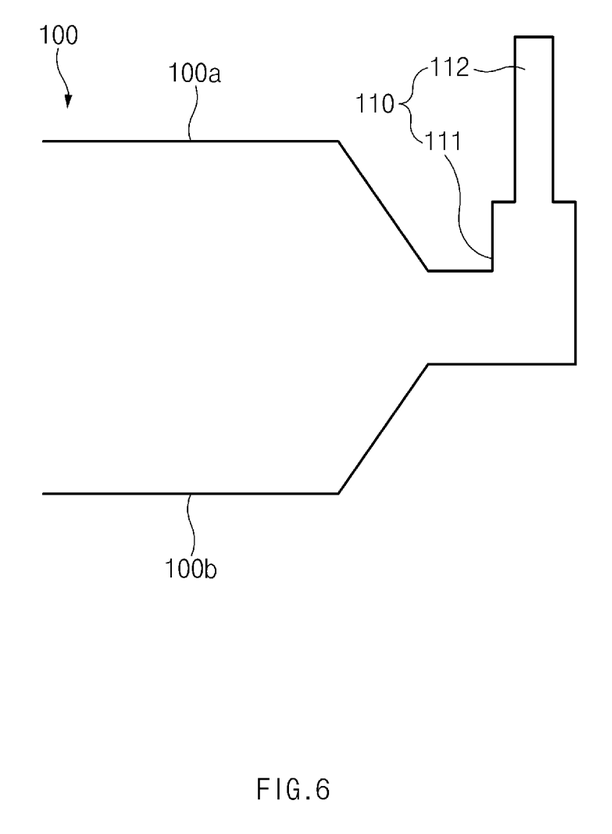
FIG. 6 is a schematic view illustrating a state in which the bonding area of the secondary battery is bent according to an embodiment of the present invention.

FIG. 6 is a schematic view illustrating a state in which the bonding area of the secondary battery is bent according to an embodiment of the present invention.

As illustrated in FIGS. 4 and 6, the polypropylene layer Z" of the foldable and bendable portion may have a thickness greater than that of the polypropylene layer Z' of the portion of the outside of the bonding area 110 to prevent cracks from occurring in the polypropylene layer Z" by the folding and the bending. When the polypropylene layer Z" of the secondary battery is cracked, the limitations such as the insulation failure and the pouch corrosion in the secondary battery may occur, and thus, it may be necessary to prevent the cracks from occurring in the polypropylene layer Z".

Hereinafter, the secondary battery according to an embodiment of the present invention will be described in detail with reference to the accompanying drawings.

As illustrated in FIGS. 2 to 4, the secondary battery according to an embodiment of the present invention may include a pouch 100 accommodating an electrode assembly and an electrolyte and a bonding area 110 disposed on a circumferential portion of the pouch 100. The bonding area 110 includes a weak bonding part 111 that is foldable and bendable and a sealing part 112 disposed on an outer edge of the weak bending part 111 and sealed.

The pouch 100 includes an upper pouch 100a and a lower pouch 100b. Each of the upper pouch 100a and the lower pouch 100b may include a nylon layer X on an outer periphery, an aluminum layer Y on a central portion, and a polypropylene (PP) layer Z on the inside.

The upper pouch 100a and the lower pouch 100b may be bonded to each other by the bonding area 110 disposed on circumferential portions facing each other.

Particularly, the polypropylene layers Z respectively provided inside the upper pouch 110a and the lower pouch 110b on the bonding area 110 may be heated and pressed to be bonded to each other.

Here, the bonding area may be heated and pressed by adjusting a temperature and a pressure so that the polypropylene layers Z are bonded to each other while being maintained in its original shape.

In the bonding area 110, when each of thicknesses of the polypropylene layer Z inside the upper pouch 100a and the polypropylene layer Z inside the lower pouch 100b is referred to as "c", and a thickness of the polypropylene layer Z" inside the weak bonding part 111 is referred to as "t", the following equation: $2c*0.60 \leq t < 2c$ is satisfied to maximally maintain the original shape of the polypropylene layer Z.

As illustrated in FIG. 6, the weak bonding part 111 may maximally maintain the original shape of the polypropylene layer Z" to prevent the cracks from occurring by the external force such as the folding and banding, thereby preventing the insulation failure and the pouch corrosion from occurring in the secondary battery.

The sealing part 112 may be disposed on a portion of the outer edge of the weak bonding part 111, at which the folding and the bending are not performed, to seal moisture from being permeated into the bonding area 110.

Thus, the sealing part 112 may be heated and pressed at a temperature and pressure greater than those applied to the weak bonding part 111 so that bonding force greater than that applied to the weak bonding part 111 is provided.

Also, the sealing part 112 may be heated and pressed at a temperature and pressure greater than those applied to the weak bonding part 111 and thus have a thickness less than that of the weal bonding part 111.

As a result, the bonding area 110 may be provided as a stepped layer having a thickness that increases from the sealing part 112 disposed on the outer edge to the weak bonding part 111 that is disposed on the inside. Also, a stepped layer may be provided so that a thickness thereof increases again from the bonding area 110 to the inner body part of the pouch 100.

As described above, the stepped layer may have a thickness that sequentially increases inward from the outermost edge of the pouch 100, and thus, the sealing function of the sealing part 112 may be maintained, and the bending force and the deformable function of the weak bonding part 111 such as the folding and the bending may be maintained. In addition, the function of the body part of the pouch 100, which is capable of accommodating the electrode assembly and the electrolyte, may be maintained.

As described above, according to the present invention, the bonding area around the pouch may be divided into the sealing part and the weak bonding part to prevent the polypropylene layer from being cracked even though deformation occurs by bending and folding of the bonding area due to external force.

According to the present invention, the occurrence of the cracks in the polypropylene layer may be prevented to remove the factors such as the insulation failure and the pouch corrosion.

According to the present invention, the bonding area may be previously heated and pressed at the low pressure and the low temperature to minimize the variation in thickness of the polypropylene layer.

According to the present invention, the bonding area may be weakly bonded to be maintained at a predetermined thickness to provide the stable durability.

According to the present invention, the outer edge of the bonding area may be heated and pressed at the higher pressure and temperature than those applied to other portions of the bonding area to seal the outer edge of the bonding area, thereby preventing the moisture from being permeated.

According to the present invention, the portion of the bonding area, on which the folding and the bending are not required, may be sealed to prevent the cracks from occurring.

According to the present invention, the stepped layers may be provided so that the weak bonding area has a thickness greater than that of the sealing part, and the pouch body part has a thickness greater than that of the weak bonding part to maintain the functions each of the sealing part, the weak bonding part, and the body part.

Although the secondary battery and the method for manufacturing the same according to the present invention has been described above with reference to the exemplary drawings, various changes and modifications may be made thereto by one skilled in the art without departing from the scope and spirit of the invention as set forth in the appended claims.

What is claimed is:

1. A method for manufacturing a secondary battery, the method comprising:
　　a preparation process of preparing a pouch in which an electrode assembly and an electrolyte are accommodated, wherein the pouch includes an upper pouch with a first internal polypropylene layer at a lower surface thereof and a lower pouch with a second internal polypropylene layer at an upper surface thereof;

a bonding process of bonding a bonding area at a circumferential portion of the pouch using a bonding device; and after the bonding process, a sealing process of sealing an outside of the bonding area of the pouch that is bonded in the bonding process by using a sealing device, wherein, in each of the bonding process and the sealing process, the first and second internal polypropylene layers are heated and pressed so as to be sealed, and wherein the outside of the bonding area is heated and pressed in the sealing process at a pressure greater than that applied to the bonding area in the bonding process such that the first and second internal polypropylene layers form a seal.

2. The method of claim 1, wherein the bonding area is bonded at a bonding force of about 0.1 kgf/15 mm to about 2.0 kgf/15 mm in the bonding process, and wherein the sealing area is bonded at a bonding force greater than 2.0 kgf/15 mm in the sealing process.

3. The method of claim 1, wherein a thickness of each of the first and second internal polypropylene layers is unchanged in the bonding process, and wherein a thickness of each of the first and second internal polypropylene layers is decreased in the sealing process.

4. The method of claim 1, wherein, in the sealing process, a temperature is applied to the outside of the bonding area that is greater than a temperature applied to another portion of the bonding area.

5. The method of claim 4, wherein, after the sealing process, a total thickness of the first and second internal polypropylene layers at the outside of the bonding area is less than that at the other portion of the bonding area.

6. The method of claim 1, wherein, in the sealing process, a portion of the bonding area on which folding and bending are not performed is sealed.

* * * * *